United States Patent [19]

Ang et al.

[11] Patent Number: 4,595,465
[45] Date of Patent: Jun. 17, 1986

[54] MEANS AND METHOD FOR REDUCING CARBN DIOXIDE TO PROVIDE AN OXALATE PRODUCT

[75] Inventors: Peter G. P. Ang; Anthony F. Sammells, both of Naperville, Ill.; Abraham Morduchowitz, Monsey, N.Y.

[73] Assignee: Texaco Inc., White Plains, N.Y.

[21] Appl. No.: 686,161

[22] Filed: Dec. 24, 1984

[51] Int. Cl.⁴ ............................................. C25B 3/04
[52] U.S. Cl. ........................... 204/59 R; 204/59 QM; 204/72; 204/75; 204/157.75; 204/252; 204/263; 204/265; 204/266; 429/111
[58] Field of Search ............... 204/59 QM, 59 R, 72, 204/75, 157.1 R, 158 R, 252, 263, 265, 266; 429/111

[56] References Cited

U.S. PATENT DOCUMENTS

| | | | |
|---|---|---|---|
| 3,720,591 | 3/1973 | Skarlos | 204/59 R |
| 4,215,182 | 7/1980 | Ang et al. | 429/111 |
| 4,240,882 | 12/1980 | Ang et al. | 204/59 R |
| 4,523,981 | 6/1985 | Ang et al. | 425/111 |

Primary Examiner—John F. Niebling
Attorney, Agent, or Firm—Robert A. Kulason; James J. O'Loughlin; Ronald G. Gillespie

[57] ABSTRACT

A process and apparatus for converting metallic elements to metallic oxalates in the presence of carbon dioxide includes two redox couple electrolyte solutions separated by a first membrane having photosensitizers. The carbon dioxide to be reduced is provided to a second membrane which is contiguous to one of the redox couple electrolyte solutions. The second membrane has photosensitizers and a catalyst. A non-aqueous electrolyte slurry, which includes a metal element, solvent and salt, is provided in a manner so that some of the slurry is in contact with the second membrane. Both membranes are illuminated and electrical voltage is provided across the electrolyte solutions and the electrolyte slurry in a manner so that there is one electrode in another electrolyte solution and another electrode in the electrolyte slurry so as to cause a reaction between the carbon dioxide at the second membrane and the electrolyte slurry to produce the metallic oxalate.

24 Claims, 1 Drawing Figure

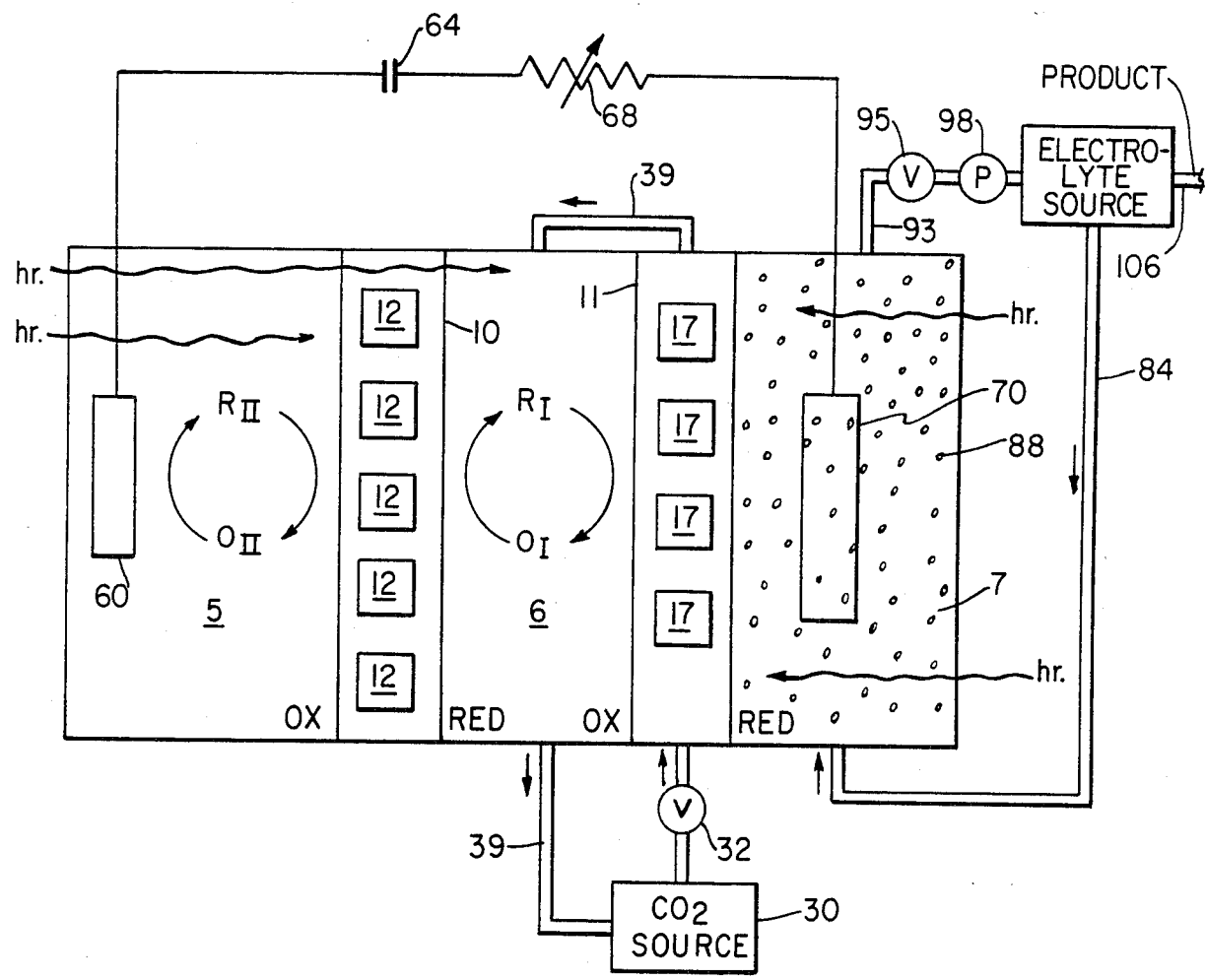

4,595,465

MEANS AND METHOD FOR REDUCING CARBN DIOXIDE TO PROVIDE AN OXALATE PRODUCT

BACKGROUND OF THE INVENTION

Field of the Invention

The present invention relates to photoelectrical chemical methods and apparatus for reducing carbon dioxide.

SUMMARY OF THE INVENTION

A process and apparatus for oxidizing metallic elements to metallic oxalates in the presence of carbon dioxide includes two redox couple electrolyte solutions separated by the first membrane having photosensitizers. The carbon dioxide is provided to a second membrane which is contiguous to one of the redox couple electrolyte solutions. The second membrane has photosensitizers and a catalyst. A non-aqueous electrolyte slurry, which includes a metal element, solvent and salt, is provided in a manner so that some of the slurry is in contact with the second membrane. Both membranes are illuminated and electrical voltage is provided across the electrolyte solutions and the electrolyte slurry in a manner so that there is one electrode in one electrolyte solution and another electrode in the electrolyte slurry so as to cause a reaction between the carbon dioxide at the second membrane and the electrolyte slurry to produce the metallic oxalate.

The objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be contrued as defining the limits of the invention.

DESCRIPTION OF THE DRAWINGS

The FIGURE is a diagrammatic representation of a photoelectrochemical system constructed in accordance with the present invention for using carbon dioxide to obtain an oxalate product.

DESCRIPTION OF THE INVENTION

Referring now to the FIGURE, a photoelectrochemical reduction cell 1 made of material which permits the passage of light while not passing a fluid, is divided into three chambers, 5, 6 and 7 by membranes 10 and 11. Membranes 10 and 11, which may be made of Nafion, contain photosensitizer material represented by blocks 12 and 17, respectively. Membrane 11 will be discussed in detail hereinafter. Membrane 10 with photosensitizers 12 may be also referred to as photosystem II, while membrane 11 with photosensitizers 17 may also be referred to as photosystem I.

Membrane 11 is of the type described and disclosed in U.S. application Ser. No. 593,221, filed Mar. 27, 1984, U.S. Pat. No. 4,545,872, and assigned to Texaco Inc., assignee of the present invention. Suffice to say that membrane 11 has a hydrophobic barrier section having channels through which is provided with carbon dioxide. Membrane 11 also has an n-semiconductor material section which provides an oxidation surface to the aqueous electrolyte solution in chamber 6. The carbon dioxide migrates through membrane 11 to the reduction surface of membrane 11. The reduction surface of membrane 11 has a catalyst.

Photosystem II may use photosensitizers 12 from the following elements: n—$TiO_2$, n—$Fe_2O_3$, n—$WSe_2$, p—InP, methylene blue or porphyrins while photosystem I may use photosensitizers 17 from the following elements: p—InP, p—$WSe_2$, p—GaAs, p—CdTe, n—$WSe_2$, n—CdSe, $Ru(bipy)_3Cl_2$ or phthalocyanines.

Chamber 5 contains an aqueous electrolyte, while chamber 6 contains another aqueous electrolyte. By way of example, the solution in chamber 5 may have a redox system $R_{II}/O_{II}$ from the following redox systems: $H_2O/O_2$, $Br^-/Br_2$, $H_2/H_2O$, methylene blue, $Fe^{+2}/Fe^{+3}$ or EDTa. Chamber 6 may have a redox system $R_I/O_I$ from the following redox systems: $I^-/I_2$, $S^2/S_n^{2-}$, triethanolamine or methyl viologen.

The following Table I shows preferred combinations of $R_{II}/O_{II}$, $R_I/O_I$, photosystem II and photosystem I.

TABLE I

| $R_{II}O_{II}$ | Photosystem II | $R_I/O_I$ | Photosystem I |
|---|---|---|---|
| $H_2O/O_2$ | n-$TiO_2$, n-$Fe_2O_3$ | None | p-InP or p-$WSe_2$, p-GaAs or p-CdTe |
| $Br^-/Br_2$ | n-$WSe_2$ | $I^-/I_2$ | n-$WSe_2$ |
| $H_2/H_2O$ of methylene blue | p-InP | $S^{2-}/S_n^{2-}$ | n-CdSe |
| $Fe^{+2}/Fe^{+3}$ | methylene blue | Triethanolamine | $Ru(bipy)_3Cl_2$ |
| EDTA | Porphyrins | Methyl viologen | phthalocyanines |

A source 30 provides $CO_2$ through a valve 32 to membrane 11 in reduction cell 1. Some of the carbon dioxide passes through the hydrophobic barrier and is reduced at the surface in chamber 7 as hereinafter explained. Unreacted carbon dioxide from membrane 11 is returned to source 30 by way of a line 39.

A biasing circuit is used to improve the electron transfer. Such a circuit includes an electrode 60 which is connected to the negative terminal of a battery 64 whose positive terminal is connected to a potentiometer 68. Potentiometer 68 is connected to another electrode 70.

Chamber 7 contains non-aqueous electrolyte provided by an electrolyte source means 82 by way of a line 84 to chamber 7. The non-aqueous electrolyte comprises small beads 88 of a conductive plastic, coated with either zinc or cadmium, in a solvent, such as DMF (dimethylformamide) or MeCN (acetonitrile), with a supporting electrolyte such as $B_4NClO_4$ (tetrabutylammoniumperclorate). Beads 88 contact electrode 70 and react within chamber 7, as hereafter explained, are then removed along with the reaction product by way of a line 93 to electrolyte source means 82. The flow in line 93 is controlled by a valve 95 and a pump 98. The reaction product, which is zinc oxalate or cadmium oxalate, depending on the coating material, is removed by way of line 106. The beads are recoated electrochemically with zinc or cadmium and returned to chamber 7 by way of line 84.

THEORETICAL DISCUSSION

The left surface of membrane 10 subjected to direct illumination will typically consist of an n-type semiconductor material thereby generating a negative photopotential. This negative photopotential is a result of excitation of electrons from the valence to conduction band of the semiconductor material. Electron holes left in the valence band will drive the oxidation of $R_{II} \rightarrow O_{II}$ on the illuminated side of PS II. $R_{II}/O_{II}$ represents reduced oxidized species in the solution. Ideally, as in the case of natural photosynthesis, this couple should be $H_2O/O_2$. In practice, however, not many n-type semiconductors are stable enough to evolve oxygen. Those that can do it ($TiO_2$, $SrTiO_3$, $Fe_2O_3$) have relatively large band gaps, which means they do not absorb a major portion of sunlight. When a low band gap material such as n—$WSe_2$ is used, a redox couple such as $Br^-/Br_2$ has been found stable with this semiconductor. However, generation of $H_2O/O_2$ would lead to photocorrosion effects at the semiconductor. With the use of battery 64, potentiometer 68 and auxiliary electrode 60, the oxidized species $O_{II}$ (such as bromine) is reduced back to $R_{II}$ (such as bromide). The auxiliary electrode 70 is biased with a positive voltage so that it oxidizes water species to oxygen.

While an oxidation reaction occurs on the left side of PS II, a corresponding reduction reaction $O_I''R_I$ occurs on the right side. This occurs because electrons in PS II become photoexcited to higher energy levels (i.e., more negative potentials), as shown in FIG. 4. The left side of PS I will also interact with $R_I/O_I$. Thus, $R_I/O_I$ acts like a large transfer relay. The equilibrium electrochemical potential of $R_I/O_I$ is more negative than $R_{II}/O_{II}$; consequently, when excitation of the semiconductor material corresponding to PS I occurs, its photoexcited electrons will be able to reach much higher levels compared to the photoexcitation level of PS II. Electron holes will oxidize $R_I$ to $O_I$ on the left side of PS I. On its right side, the highly energized photoexcited electrons will have the potential to reduce $CO_2$ species. However, competing reactions such as reduction of water species to hydrogen will also occur. It is here that that the role of surface catalysts, previously referred to in Table II, will be important. The catalyst for each semiconductor/electrolyte system will be chosen to efficiently produce the most desirable reaction product (e.g. Pb, In, or Hg to produce formic acid).

For both PSI and PS II, n- or p-type semiconductor materials can be used depending upon the direction of illumination. n-type semiconductors will generate a negative photopotential, drive an oxidation reaction on its illuminated surface, and a reduction reaction on its dark side. p-Type material will generate a positive photopotential, drive a reduction reaction on its illuminated surface, and an oxidation reaction on its unilluminated side. The net effect of the overall process will be an electron movement through the photo-reducing membrane from the left side to the right side. To keep electroneutrality in the system, this charge movement has to be balanced by equal migration of positive charges. Nafion membranes are good cation exchangers for species such as $H^+$. The protons will be used on the right side with $CO_2$ to produce zinc oxalate or cadmium oxalate.

Chamber 7 has two half reactions occurring in it to produce the oxalates. When sphere 88 comes into contact with electrode 70 one of the following half reactions takes place:

$$Zn''Zn^{2+} + 2e,$$

or $$Cd''Cd^{2+} + 2e.$$

The carbon dioxide at the reduction surface becomes oxalic acid as a result of the following reaction:

$$2H^+ + 2CO_2''(CO_2H)_2$$

the two half reactions merged into the final reaction $$(CO_2H)_2 + Zn''ZnC_2O_4 + 2H^+ + 2e^-,$$

or $$(CO_2H)_2 + Cd^{2+}''CdC_2O_4 + 2H^+ + 2e^-.$$

The present invention as hereinbefore described is a photoelectrochemical method and apparatus for reducing carbon dioxide in cooperation with zinc or cadmium to provide zinc oxalates or cadmium oxalates.

What is claimed is:

1. A process for reducing carbon dioxide in the presence of a metal element to provide a metallic oxalate comprising the steps of:
   providing a $R_{II}/O_{II}$ redox couple electrolyte solution,
   providing a $R_I/O_I$ redox couple electrolyte solution,
   separating $R_{II}/O_{II}$ solution from the $R_I/O_I$ from the $R_I/O_I$ with a first membrane having photosensitizers,
   providing carbon dioxide to a second membrane contiguous to the $R_I/O_I$ solution and having photosensitizers and a catalyst,
   providing a slurry of a metal element solvent and salt in a manner so that some of the slurry is in contact with the second membrane,
   illuminating both membranes,
   providing an electrical voltage across the $R_{II}/O_{II}$ and $R_I/O_I$ electrolyte solution and the electrolyte slurry in a manner so that there is one electrode in the $R_{II}/O_{II}$ electrolyte solution and another electrode in the electrolyte slurry so as to cause a reaction between the carbon dioxide at the second membrane and the electrolyte slurry to produce the metallic oxalate.

2. A process as described in claim 1 in which the salt is tetrabutylammoniumperchlorate.

3. A process as described in claim 2 in which the metal element is dispersed in the electrolyte slurry in the form of metallic coatings on beads of electrically conductive material.

4. A process as described in claim 3 in which the solvent is dimethylformamide.

5. A process as described in claim 3 in which the solvent is acetonitroile.

6. A process as described in claim 3 in which the metal coating on the beads is zinc.

7. A process as described in claim 3 in which the metal coating on the beads is cadmium.

8. A process as described in claim 3 in which the $R_{II}/O_{II}$ redox coupled electrolyte solution is selected from a group of redox couples including $H_3O/O_2$, $Br^-/Br_2$, methylene blue, $Fe^{+2}/Fe^{+3}$ and EDTA.

9. A process as described in claim 8 in which the first membrane's photosensitizer is selected from a group of photosensitizers including n—$TiO_2$, n—$Fe_2O_3$, n—$WSe_2$, p—InP, methylene blue and porphyrins.

10. A process as described in claim 9 in which the $R_I/O_I$ redox coupled electrolyte solution is selected from a group of redox couples including $I^-/I_2$, $S^{2-}-S_n^2$, triethanolamine and methyl viologen.

11. A process as described in claim 10 in which the second membrane's photosensitizer is selected from a group of photosensitizers including p—InP, p—WSe$_2$, p—GaAs, p—CdTe, n—WSe$_2$, n—CdSe, Ru(bipy)$_3$Cl$_2$ and phthalocyanines.

12. A process as described in claim 9 in which the catalyst is on the surface of the second membrane that is in contact with the CO$_2$ and is selected from a group of catalysts including dichalcogenides of the metals (Ni, Co, Mo, W), SrTiO$_3$, NADPH, metal coatings (Pb, In), amalgams (Ni, Zn), chrysene, ethyl acrylate, phthalocyanines (Ni, Co), porphyrins and methyl viologen.

13. Apparatus for producing a metallic oxalate using carbon dioxide comprises:

means for containing a first redox coupled electrolyte solution, means for containing a second redox coupled electrolyte solution, first means responsive to illumination for transferring electrons from the first electrolyte solution to the second electrolyte solution, means for providing an electrolyte slurry of a metal element, a solvent and a salt, means for containing the electrolyte slurry, carbon dioxide means for providing carbon dioxide, means having one electrode located in the first redox coupled electrolyte solution and another electrode located in the electrolyte slurry for providing a biasing voltage across the electrodes, and second means receiving carbon dioxide from carbon dioxide means and responsive to illumination for transferring electrons from the second redox coupled electrolyte solution to the electrolyte slurry and for providing a reduction surface contiguous to the electrolyte slurry for the carbon dioxide so as to cause a chemical reaction to reduce the metal element in the slurry to a metallic oxalate.

14. Apparatus as described in claim 13 in which the metal element is dispersed in the electrolyte slurry in the form of metallic coatings on beads of conductive material.

15. Apparatus as described in claim 14 in which the salt is tetrabutylammoniumperclorate.

16. Apparatus as described in claim 15 in which the metal element is zinc and the metallic oxalate is zinc oxalate.

17. Apparatus as described in claim 15 in which the metal element is cadmium and the metallic oxalate is cadmium oxalate.

18. Apparatus as described in claim 15 in which the solvent is dimethylformamide.

19. Apparatus as described in claim 15 in which the solvent is acetonitrile.

20. Apparatus as described in claim 19 in which the reduction means includes:

semiconductor means responsive to illumination for transferring electrons from an electrolyte solution, and hydrophobic means adjacent to the semiconductor means and having a catalyst impregnated surface and passageways for the carbon dioxide for permitting a substantial portion of the carbon dioxide to migrate to and through the catalyst impregnated surface to the reduction surface and not permeable to electrolyte.

21. Apparatus as described in claim 20 in which the semiconductor material is selected from a group of photosensitizers including p—InP, p—WSe$_2$, p—GaAs, p—CdTe, n—WSe$_2$, n—CdSe, Ru(bipy)$_3$Cl$_2$ and phthalocyanines.

22. Apparatus as described in claim 21 in which the catalyst is impregnated in the surface of the hydrophobic means and is selected from a group of catalysts including dichalcogenides (Ni, Co, Mo, W), SrTiO$_3$, NADPH, metal coatings (Pb, In), amalgams (Ni, Zn), chrysene, ethyl acrylate, phthalocyanines (Ni, Co), porphyrins and methyl viologen.

23. Apparatus as described in claim 22 in which a biasing voltage is provided across the first electrolyte solution and the water in a manner so that the water is anodically biased relative to the first electrolyte solution.

24. Apparatus as described in claim 23 in which the illumination is solar radiation.

* * * * *